3,551,434
CERTAIN 5-(2-PYRIDYL)-4,5-DIHYDRO-1,3,4-THIADIAZOLE-2-THIOL DERIVATIVES

Karl-Heinz Mayer, Leverkusen, Konrad Swincicki, Cologne-Stammheim, Siegfried Petersen, Leverkusen, Robert Bierling and Hans-Joachim Seidel, Wuppertal-Elberfeld, and Dieter Steinhoff, Bochum, Germany, assignors to Farbenfabriken Bayer Aktiengesellschaft, Leverkusen, Germany, a corporation of Germany
No Drawing. Filed Feb. 5, 1968, Ser. No. 702,819
Claims priority, application Germany, Feb. 18, 1967,
F 51,569, F 51,570, F 51,571
Int. Cl. C07d 31/50
U.S. Cl. 260—294.8       5 Claims

ABSTRACT OF THE DISCLOSURE

A one-step process is provided for producing in good yield and high purity 4,5-dihydro-1,3,4-thiadiazole-2-thiols substituted in the 5-position by pyridyl or alkylpyridyl. The process involves the reaction of a carbonyl compound

wherein $R^1$ is pyridyl or alkylpyridyl and $R^2$ is hydrogen, lower alkyl or phenyl, with at least the stoichiometric amount of carbon disulphide and hydrazine or hydrazine-hydrate in an organic solvent or in an organic solvent and water at about 20–100° C. 5-(pyridyl-2)-4,5-dihydro-1,3, 4-thiadiazole-2-thiol is exemplary, the pyridyl group being derived from a pyridine aldehyde. Water-soluble crystalline salts can also be obtained which are also useful for their inhibiting action against transpalnted tumors in animals. The production of stable crystalline salts of compounds which are chemically relatively unstable aldehyde derivatives is most surprising. Details of tumor-inhibiting action are given for rats and mice against a variety of tumors with good results.

---

4,5-dihydro-1,3,4-thiadiazole-2-thiols substituted in the 5-position are known ("Tetrahedron" 1966, volume 22, pages 913 to 923). They are there designated according to their tautomeric notation as 1,3,4-thiadiazolidine-2-thiones and can be prepared by two different methods as represented by the reaction schemes:

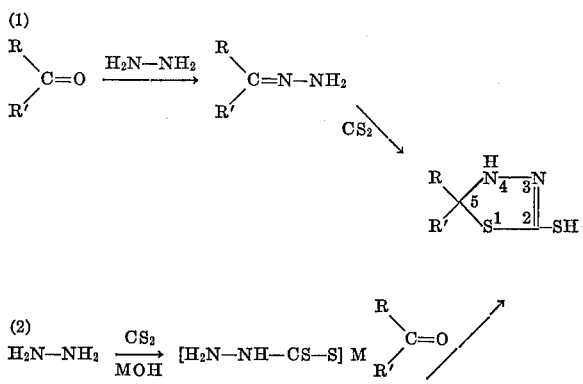

Both methods require two reaction steps as will be observed and also possess other substantial disadvantages as will be clear from the following.

By method (1) there is first prepared from a carbonyl compound and hydrazine or hydrazine-hydrate a hydrazone which is then further reacted with carbon disulphide. However, the preparation of hydrazones is always very difficult for the reasons described in detail in J. Org. Chem. 1966, volume 31, pages 677 to 681, chiefly because of the predominant azine formation. Thus, there is proposed in the last-mentioned literature reference for the preparation of hydrazones a rather cumbersome method which is not without risk when carried out on a larger scale because of the use of anhydrous hydrazine, this method consisting in first reacting a carbonyl compound with N,N-dimethyl-hydrazine and then again removing, in a further reaction step, from the primarily formed dimethyl-hydrazone the N,N-dimethyl-hydrazine with anhydrous hydrazine. Moreover, a reduction of the >CO group to the >CH₂ group is frequently observed when a carbonyl compound is directly reacted with a large excess of hydrazine or hydrazine-hydrate, which is used in order to suppress the azine formation.

According to method (2) there is first prepared from hydrazine or hydrazine-hydrate, carbon disulphide and a base MOH, e.g. ammonia, a salt of the hydrazine-dithiocarbonic acid, e.g. according to J. Chem. Soc. London, 1921, volume 119, pages 763 to 765, and this salt is then reacted, in a further step, with a carbonyl compound. This process, too, is cumbersome since the isolation and purification of dithiocarbazic acid salts often encounter difficulties due to their relative instability. This is also the reason why the end products are not obtained in pure form by this method.

It has now surprisingly been found that 4,5-dihydro-1,3,4-thiadiazole-2-thiols substituted in the 5-position are obtained in a good yield and with a great degree of purity by a one-step process when a carbonyl compound of the formula:

in which $R^1$ is pyridyl unsubstituted or substituted by lower alkyl radicals, and $R^2$ is hydrogen, lower alkyl or phenyl, is reacted in any desired sequence with at least the stoichiometrically required amount of carbon disulphide and hydrazine or hydrazine-hydrate in an organic solvent, optionally also in the presence of water, within a temperature range of about 20° to about 100° C.

Starting products which are especially suitable for the process according to the invention are the following: pyridine-2-aldehyde, pyridine-3-aldehyde, pyridine-4-aldehyde, 3-methyl-, 4-methyl-, 5-methyl- or 6-methylpyridine-2-aldehyde, 5-ethyl-pyridine-2-aldehyde, 4,6-dimethyl-pyridine-2-aldehyde, 1-acetyl- or 2-benzoyl-pyridine. The hydrazine may be used in the form of anhydrous hydrazine, but expediently in the form of hydrazine-hydrate, preferably in the form of anhydrous hydrazine-hydrate, but also in the form of the commercially available 20–80% by weight aqueous hydrazine-hydrate solutions.

Those solvents are preferred in which the starting products are readily soluble, but in which the end products are scarcely soluble or insoluble, and which are inert towards the reaction components or the end products. The following may be mentioned by way of example: methanol and other lower aliphatic alcohols; ethers, such as lower dialkyl ethers, dioxan or tetrahydrofuran; hydrocarbons, such as benzene, toluene, cyclohexane or ligroin; and halohydrocarbons, such as methylene chloride, chloroform, carbon tetrachloride or chlorobenzene. The solvents may be used individually and also in the form of solvent mixtures of any composition. If desired, solvents or solvent mixtures can be used which contain up to 50% by weight of water which may also be introduced or added in the course of the reaction, e.g. in the form of the water bound in the hydrazine-hydrate. Particularly advantageous is the use of carbon disulphide which may serve as solvent either by itself exceeding the stoichiometrically required amount or in admixture with other liquids.

The reaction temperatures range from about 20° C. to about 100° C., preferably from about 30° to about 50° C. The reaction components frequently combine at once already at room temperature in an exothermic reaction to form the well crystallizing end products which can readily be isolated.

However, a disadvantage of the 4,5-dihydro-1,3,4-thiadiazole-2-thiols substituted in the 5-position and obtainable by the process according to the invention resides in the fact that they are largely water-insoluble and can, therefore, not be used in an injectable form when used as pharmaceutical agents. For the application of a pharmaceutically active compound, however, its solubility is of decisive importance.

There has also been found a process for the production of crystalline and thus particularly pure salts of 4,5-dihydro-1,3,4-thiadiazole-2-thiols substituted in the 5-position, this process consisting in reacting these thiol compounds with bases in those organic solvents or solvent mixtures in which the salts are scarcely soluble.

These new salts are generally very readily soluble in water giving a neutral reaction.

The possibility of producing stable crystalline salts of compounds which are chemically relatively unstable aldehyde derivatives, must be regarded as very surprising.

The alkali metal, alkaline earth metal and ammonium salts should be especially mentioned, and also the salts with primary, secondary or tertiary aliphatic amines, which crystallize particularly well and are outstandingly water-soluble.

The new salts can be prepared in a simple manner when the starting 4,5-dihydro-1,3,4-thiadiazole-2-thiols substituted in the 5-position on which they are based are reacted in organic solvents, possibly also in the presence of water with inorganic bases, preferably with alkali metal or alkaline earth metal carbonates or hydrogen carbonates, alkali metal or alkaline earth metal hydroxides or alcoholates, with ammonia or alkali metal salts of ammonia, or with organic bases, preferably with primary, secondary or tertiary aliphatic amines which are physiologically harmless. As amines there are to be understood those of the general formula:

$$\begin{array}{c} R_3 \\ | \\ N-R_4 \\ | \\ R_5 \end{array}$$

in which the radicals $R^3$, $R^4$ and $R^5$ can be identical or different and each is hydrogen or lower alkyl which may also be substituted by an OH group, or wherein two of $R^3$, $R^4$ and $R^5$, together with the N atom are piperidino or morpholino.

Individual examples are the following: sodium hydrogen carbonate, potassium hydrogen carbonate, sodium carbonate, potassium carbonate, lithium carbonate, sodium hydroxide, potassium hydroxide, calcium hydroxide, magnesium hydroxide, sodium methylate, potassium ethylate, ammonia, sodium amide, methylamine, dimethylamine, triethylamine, ethanolamine, diethanolamine, triethanolamine, piperidine, morpholine and hexamethylene-imine.

By a special method of carrying out the process according to the invention it is possible to combine directly the salt formation with the preparation of the 4,5-dihydro-1,3,4-thiadiazole-2-thiols substituted in the 5-position by already previously adding the base to the reaction mixture or by reacting the end product, after its formation and without intermediate isolation, by subsequently adding the base.

Another method of carrying out the process according to the invention consists in reacting dithiocarbazic acid alkali metal, alkaline earth metal, ammonium or amine salts in an organic solvent with a carbonyl compound, whereby the salts of the 4,5-dihydro-1,3,4-thiadiazole-2-thiols substituted in the 5-position precipitate in crystalline form.

It is clearly also possible to prepare directly aqueous solutions of the aforementioned salts by combining the 4,5-dihydro-1,3,4-thiadiazole-2-thiols substituted in the 5-position with the stoichiometrically required amount of the base in water. Solutions of this type, however, are not sufficiently stable for present purposes.

The solvents used for the preparation of the salts are the same as those used for the preparation of the compounds on which they are based, whereby, also in this case, a proportion up to 50% by weight of water may be present.

Since the salt formation represents an ionic reaction, it can be carried out at room temperature. If it is carried out together with the synthesis of the 4,5-dihydro-1,3,4-thiadiazole-2-thiol compound, then the process is performed within the temperature range indicated for this purpose of 20° to 100° C., preferably of 30° to 50° C.

The 4,5-dihydro-1,3,4-thiadiazole-2-thiols substituted in the 5-position such as by pyridyl or alkylpyridyl and the salts thereof according to the invention can be used by themselves for transplanted animal tumor inhibiting purposes and as intermediate products for preparing plant protectantts as herbicides or fungicides. The products have the formula:

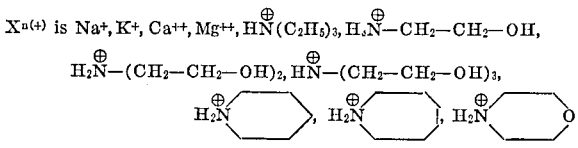

in which $R^2$ is hydrogen, lower alkyl or phenyl, $R^6$ and $R^7$, independently of one another, are each hydrogen or alkyl of 1 to 4 carbon atoms,

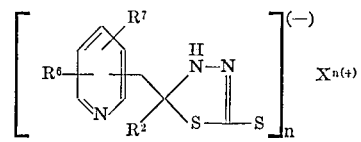

and $n$ is 1 or 2.

Because of their pronounced inhibiting action against transplanted animal tumors, those products of the present invention are particularly valuable which contain pyridine-2-aldehydes or -ketones respectively such lower alkyl substituted products as carbonyl compound.

The inhibiting action of the new therapeutic agents against transplanted animal tumors is illustarted for example as follows. The toxicity and activity data were established by animal experiments.

The acute toxicity of these products perorally administered at rats amounts from 280 to 100 mg./kg. ($DL_{50}$).

The inhibiting action was established by various experimentally produced tumors in animals. The test animals (mice and rats) were treated for this purpose, after a tumor-inoculation on several days, intraperitoneally, subcutaneously or perorally with a suspension of the micronized test praparation. After completion of the experiment, the average tumor weight or several animals was determined and compared with that of an equal number of untreated control animals. The results are set out in the tables below.

The tumor-inhibiting action is given in the case of solid tumors in the form of the internationally adopted T/C quotients (T=tumor weight of the treated animals, C=tumor weight of the control animals).

Formula of active compound:

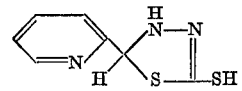

| Tumor | Animal species | Application | Dose, mg./kg./day | Results, T/C | Dead/live animals |
|---|---|---|---|---|---|
| Walker | Rats | i.p. | 80×4 | 0.5 | 2/3 |
|  |  |  | 50×4 | 0.9 | 0/5 |
|  |  | i.p. | 100×5 | 0.3 | 0/5 |
|  |  |  | 70×5 | 0.8 | 0/5 |
| Jensen | Rats |  | 35×5 | 0.9 | 0/5 |
|  |  | s.c. | 70×5 | 0.3 | 0/5 |
|  |  |  | 35×5 | 0.6 | 0/5 |
| Solid Ehrlich | Mice | i.p. | 70×4 | 0.1 | 0/5 |
|  |  |  | 60×4 | 0.1 | 0/5 |
|  |  |  | 40×4 | 0.1 | 0/5 |
|  |  |  | 30×4 | 0.1 | 0/5 |
| Adeno carc. EO 771 |  | i.p. | 50×4 | 0.3 | 0/5 |
|  |  |  | 25×4 | 0.4 | 0/5 |
|  |  |  | 50×5 | 0.3 | 0/5 |
|  |  |  | 25×5 | 0.5 | 0/5 |
| Sa 180 | Mice |  | 12.5×5 | 0.5 | 0/5 |
|  |  | s.c. | 50×5 | 0.2 | 0/5 |
|  |  |  | 25×5 | 0.3 | 0/5 |
|  |  |  | 12.5×5 | 0.4 | 0/5 |
|  |  | i.p. | 50×5 | 0.0 | 4/1 |
|  |  |  | 25×5 | 0.4 | 3/2 |
| Benzopyrene-Sa | Mice |  | 12.5×5 | 0.3 | 1/4 |
|  |  | s.c. | 25×5 | 0.1 | 1/4 |
|  |  |  | 12.5×5 | 0.3 | 0/5 |
|  |  | i.p. | 25×4 | 0.55 | 0/10 |
|  |  |  | 12.5×4 | 0.5 | 0/10 |
| Mamma-Ca | Mice | s.c. | 25×4 | 0.4 | 0/10 |
|  |  |  | 12.5×4 | 0.4 | 0/10 |

Formula of active compound:

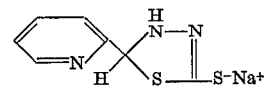

| Tumor | Animal species | Application | Dose, mg./kg./day | Results, T/C | Dead/live animals |
|---|---|---|---|---|---|
| Ehrlich carcinoma (solid) | Mice | i.p. | 125×4 | 0.0 | 2/3 |
|  |  |  | 75×4 | 0.1 | 0/5 |
|  |  |  | 50×4 | 0.2 | 0/5 |
|  |  |  | 37.5×4 | 0.4 | 0/5 |
|  |  |  | 150×2 | [1] 12.5 |  |
| Leukemia L 1210 | Mice | i.p. | 100×4 | [1] 118.8 |  |
|  |  |  | 50×4 | [1] 118.8 |  |
|  |  |  | 25×4 | [1] 131.3 |  |
|  |  |  | 10×4 | [1] 106.3 |  |
| Virus leukemia (Rauscher) | Mice | s.c. | 100×3 | 0.4 | 1/9 |
|  |  |  | 50×3 | 0.6 | 0/10 |
| Mammary tumor C3H (transpl.) | Mice | i.p. | 75×4 | 0.3 | 1/4 |
|  |  |  | 40×4 | 0.6 | 0/5 |
| Jensen sarcoma | Rats | i.p. | 100×4 | ----- | 5/0 |
|  |  |  | 50×4 | 0.6 | 1/4 |

[1] Mean survival time (MST).

Formula of active compound:

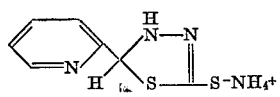

| Tumor | Animal species | Application | Dose, mg./kg./day | Results, T/C | Dead/live animals |
|---|---|---|---|---|---|
| Ehrlich carcinoma (solid) | Mice | i.p. | 50×4 | 0.2 | 1/4 |
|  |  |  | 30×4 | 0.2 | 0/4 |
|  |  |  | 15×4 | 0.7 | 0/4 |
| Leukemia L 1210 | Mice | i.p. | 60×4 | [1] 140 |  |
|  |  |  | 40×4 | [1] 140 |  |
|  |  |  | 20×4 | [1] 126.7 |  |
|  |  |  | 10×4 | [1] 113.3 |  |
| Virus leukemia (Rauscher) | Mice | s.c. | 30×3 | 0.4 | 0/10 |
|  |  |  | 10×3 | 0.7 | 0/10 |
| Jensen sarcoma | Rats | i.p. | 60×4 | 0.6 | 1/4 |
|  |  |  | 30×4 | 1.0 | 0/5 |

[1] Mean survival time (MST).

Formula of active compound:

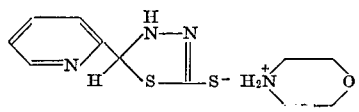

| Tumor | Animal species | Application | Dose, mg./kg./day | Results, T/C | Dead/live animals |
|---|---|---|---|---|---|
| Ehrlich carcinoma (solid) | Mice | i.p. | 100×4 | 0.3 | 1/4 |
|  |  |  | 50×4 | 0.2 | 0/5 |
|  |  |  | 30×4 | 0.6 | 0/5 |
|  |  | i.v. | 50×4 | 0.1 | 0/5 |
|  |  | p.o. | 200×4 | 0.2 | 0/5 |
| Leukemia L 1210 | Mice | i.p. | 80×4 | [1] 140 |  |
|  |  |  | 40×4 | [1] 120 |  |
| Virus leukemia (Rauscher) | Mice | s.c. | 100×3 | 0.6 | 0/10 |
|  |  |  | 50×3 | 0.4 | 0/10 |
|  |  |  | 25×3 | 0.5 | 0/10 |
| Mammary tumor C3H (transpl.) | Mice | i.p. | 60×4 | 0.4 | 0/5 |
| Jensen sarcoma | Rats | i.p. | 75×4 | 0.4 | 2/3 |

[1] Mean survival time (MST).

Formula of active compound:

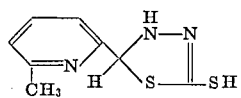

| Tumor | Animal species | Application | Dose, mg./kg./day | Results, T/C | Dead/live animals |
|---|---|---|---|---|---|
| Ehrlich carcinoma (solid) | Mice | i.p. | 150×4 | 0.2 | 2/2 |
|  |  |  | 80×4 | 0.4 | 0/4 |
| Leukemia L 1210 | Mice | i.p. | 150×3 | [1] 46.7 |  |
|  |  |  | 100×3 | [1] 146.2 |  |
|  |  |  | 75×4 | [1] 126.7 |  |
| Jensen sarcoma | Rats | i.p. | 120×4 | 0.4 | 3/2 |
|  |  |  | 60×4 | 0.5 | 0/5 |

[1] Mean survival time (MST).

Formula of active compound:

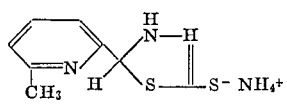

| Tumor | Animal species | Application | Dose, mg./kg./day | Results, T/C | Dead/live animals |
|---|---|---|---|---|---|
| Ehrlich carcinoma (solid) | Mice | i.p. | 150×4 | 0.1 | 2/2 |
|  |  |  | 100×4 | 0.1 | 0/5 |
|  |  |  | 74×4 | 0.3 | 0/4 |
|  |  | p.o. | 300×4 | 0.1 | 1/3 |
|  |  |  | 150×4 | 0.2 | 0/5 |
| Leukemia L 1210 | Mice | i.p. | 150×2 | [1] 100 |  |
|  |  |  | 75×4 | [1] 120 |  |
| Virus leukemia (Rauscher) | Mice | s.c. | 150×3 | 0.3 | 1/9 |
|  |  |  | 125×3 | 0.4 | 0/10 |
|  |  |  | 100×3 | 0.6 | 0/10 |
| Jensen sarcoma | Rats | i.p. | 60×4 | 0.4 | 0/5 |
|  |  |  | 34×4 | 0.5 | 0/5 |

[1] Mean survival time (MST).

Formula of active compound:

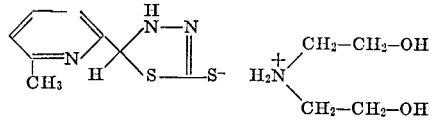

| Tumor | Animal species | Application | Dose, mg./kg./day | Results, T/C | Dead/live animals |
|---|---|---|---|---|---|
| Ehrlich carcinoma (solid) | Mice | i.p. | 200×4 | 0.1 | 0/4 |
|  |  |  | 125×4 | 0.1 | 0/5 |
|  |  |  | 80×4 | 0.2 | 0/4 |
|  |  |  | 50×4 | 0.2 | 0/4 |
| Leukemia L 1210 | Mice | i.p. | 400×1 | [1] 20 |  |
|  |  |  | 200×4 | [1] 126.7 |  |
|  |  |  | 100×4 | [1] 113.3 |  |
|  |  |  | 50×4 | [1] 126.7 |  |

[1] Mean survival time (MST).

Formula of active compound:

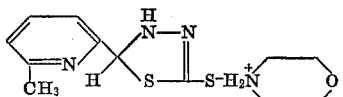

| Tumor | Animal species | Application | Dose, mg./kg./day | Results, T/C | Dead/live animals |
|---|---|---|---|---|---|
| Ehrlich carcinoma (solid) | Mice | i.p. | 250×4 | 0.0 | 2/2 |
| | | | 150×4 | 0.2 | 0/4 |
| | | | 50×4 | 0.8 | 0/5 |
| Leukemia L 1210 | Mice | i.p. | 300×4 | ¹ 40 | |
| | | | 150×4 | ¹ 133.3 | |

¹ Mean survival time (MST).

Also with the other compounds described in this specification, similar results as obvious from the tables above can be obtained.

The invention is illustrated by the following non-limitative examples.

EXAMPLE I

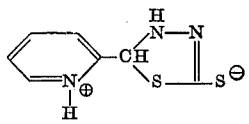

(a) 10.7 g. of pyridine-2-aldehyde are dissolved in 30 ml. of methanol and 30 ml. of carbon disulphide. A mixture of 5 ml. of 100% hydrazine-hydrate and 25 ml. of methanol is allowed to run into this solution. The temperature rises to 40° C. and crystals immediately precipitate. Heating is continued at 40° C. for a further 15 minutes and, after cooling, the crystals are isolated by suction-filtration. After washing with water and methanol there are obtained 15.5 g. of 5-(pyridyl-2)-4,5-dihydro-1,3,4-thiadiazole-2-thiol of M.P. 111 to 113° C. (decomposition).

50 ml. of 100% hydrazine-hydrate and 107 g. of pyridine - 2 - aldehyde are successively dissolved in 500 ml. of methanol and, after the exothermic reaction has subsided, 150 ml. of carbon disulphide are allowed to run in. Crystals immediately precipitate from the clear solution. The temperature is maintained at 40° C. for a further 25 minutes, the mixture is cooled and the reaction product isolated by suction-filtration. Yield: 156 g. of 5-(pyridyl-2) - 4,5 - dihydro - 1,3,4 - thiadiazole - 2 - thiol; after washing with water and methanol, the melting point is 111° C. (decomposition).

(c) 75 ml. of carbon disulphide are allowed to run, while cooling with ice, into a solution of 25 ml. of 100% hydrazine-hydrate in 375 ml. of methanol, and the hydrazonium salt of the hydrazine-dithiocarboxylic acid first crystallizes out. 53.5 g. of pyridine - 2 - aldehyde are then allowed to run in and the mixture is heated at 40° C. for about 15 minutes. The hydrazonium salt is thereby completely transformed into the crystalline 5-(pyridyl-2)-4,5-dihydro-1,3,4-thiadiazole-2 - thiol. After suction-filtration, the product is washed with water and methanol and there are obtained 87 g. of M.P. 111° C. (decomposition).

EXAMPLE 2

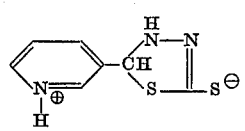

5 ml. of 100% hydrazine-hydrate, 10.7 g. of pyridine-3-aldehyde and 15 ml. of carbon disulphide are mixed in 50 ml. of methanol. Crystals at once separate from the clear solution and the temperature rises to 40° C. The mixture is stirred at 40° C. for a further 20 minutes and the crystals are subsequently filtered off with suction at 0° C. After washing with water and methanol there are obtained 17.6 g. of M.P. 117 to 119° C. (decomposition).

EXAMPLE 3

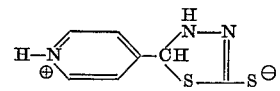

150 ml. of carbon disulphide and 107 g. of pyridine-4-aldehyde are allowed to run successively, while cooling with ice, into 50 ml. of 100% hydrazine-hydrate, dissolved in 750 ml. of methanol. The reaction mixture is heated at 45° C. for 15 minutes and cooled to 0° C., and the crystalline reaction product is isolated after some hours by suction-filtration. After washing with water and methanol there are obtained 156 g. of M.P. 125° C. (decomposition).

EXAMPLE 4

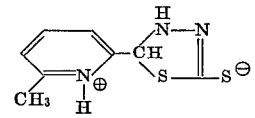

5 ml. of 100% hydrazine-hydrate are allowed to run into a mixture of 15 ml. of carbon disulphide and 25 ml. of methanol and, after the exothermic reaction is completed, there are added 12.1 g. of 6-methyl-pyridine-2-aldehyde, dissolved in 25 ml. of methanol. Stirring is continued at room temperature for a further 30 minutes, the crystals are filtered off with suction at 0° and washed with water and methanol. Yield: 14.5 g. of M.P. 104° C. (decomposition).

EXAMPLE 5

15 ml. of carbon disulphide are added dropwise at 20° C. to a solution of 4 g. of NaOH, 5 ml. of 100% hydrazine-hydrate and 10.7 g. of pyridine-2-aldehyde in 50 ml. of methanol. A yellow product immediately crystallizes out from the clear solution and the temperature rises to 40° C. When the exothermic reaction has subsided, the crystals are isolated by suction-filtration. Yield: 15.5 g. of a salt of the formula:

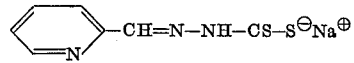

After recrystallization from alcohol/water, the M.P. is 265–267° C. (decomposition).

EXAMPLE 6

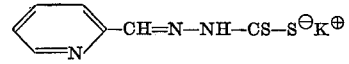

19.7 g. of 5-(pyridyl-2)-4,5-dihydro-1,3,4-thiadiazole-2-thiol are introduced, while heating, into a solution of 5.6 g. of potassium hydroxide in 50 ml. of water and 250 ml. of methanol. The potassium salt immediately crystallizes out from the solution. It is cooled to 0° C. and the yellow crystals are isolated by suction-filtration. Yield:

19.5 g. of M.P. 252–256° C. (decomposition) after recrystallization from methanol/water.

EXAMPLE 7

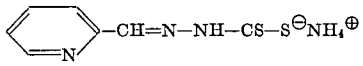

(a) Ammonia is introduced into a solution of 10 ml. of 100% hydrazine-hydrate in 250 ml. of methanol until the solution is saturated. 12 ml. of carbon disulphide are then allowed to run in, while cooling, and subsequently 21.4 g. of pyridine-2-aldehyde. The reaction mixture is briefly heated to boiling whereupon yellow crystals are precipitated. After suction-filtration, there are obtained 37 g. of M.P. 128–130° C. (decomposition). The compound crystallizes with 1 mole of water.

Instead of gaseous ammonia, there may be substituted a concentrated aqueous ammonia solution.

(b) 21.4 g. of pyridine-2-aldehyde are allowed to run into a suspension of 25 g. of the ammonium salt of hydrazine-dithio-carboxylic acid in 125 ml. of methanol and the temperature rises to 45° C. The mixture is heated at 60° C. for 5 minutes and cooled to 0° C., and the yellow crystals are isolated by suction-filtration. Yield: 28 g. of M.P. 125–126° C. (decomposition) after recrystallization from methanol. The compound crystallizes with 1 mol of water.

EXAMPLE 8

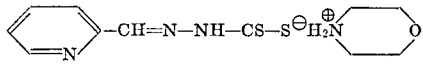

19.7 g. of 5-(pyridyl-2)-4,5-dihydro-1,3,4-thiadiazole-2-thiol are dissolved hot in 250 ml. of methanol and 25 ml. of water with the addition of 5 g. of morpholine. Upon cooling, the morpholine salt crystallizes out. After suction-filtration and washing with methanol, there are obtained 23 g. of yellow crystals of M.P. 118–120° C. (decomposition).

EXAMPLE 9

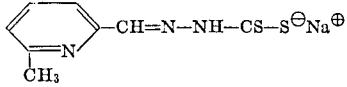

A solution of 12.1 g. of 6-methyl-pyridine-2-aldehyde in 15 ml. of carbon disulphide are allowed to run into a solution of 5 ml. of 100% hydrazine-hydrate in 50 ml. of methanol, whereupon 5-(6-methyl-pyridyl-2)-4,5-dihydro-1,3,4-thiadiazole-2-thiol crystallizes out. A solution of 2.3 g. of sodium in 200 ml. of methanol are then added and this solution is briefly heated to boiling. A clear solution is formed from which the yellow sodium salt immediately crystallizes out. After suction-filtration and washing with methanol, there are obtained 16 g. of M.P. 244° C. (decomposition).

EXAMPLE 10

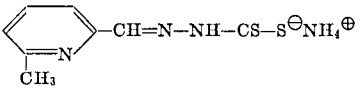

(a) 12.5 g. of the ammonium salt of hydrazine-dithio-carboxylic acid and 12.1 g. of 6-methyl-pyridine-2-aldehyde are heated at 60° C. for 5 minutes in 75 ml. of methanol. There results a yellow crystalline product which is filtered off with suction at 0° C. and subsequently washed with methanol. Yield: 19 g. of M.P. 151–153° C. (decomposition).

(b) 105 g. of 5 - (6 - methyl-pyridine-2)-4,5-dihydro-1,3,4-thiadiazole-2-thiol are ground cold with 200 ml. concentrated ammonia in a "untra-turrax," resulting in the conversion into the ammonium salt. After suction-filtration and recrystallization from water, there are obtained 85 g. of yellow crystals of M.P. 151–153° C. (decomposition).

EXAMPLE 11

12.1 g. of 6-methyl-pyridine-2-aldehyde, 15 ml. of carbon disulphide and a solution of 6 g. of KOH in 10 ml. of water are allowed to run into a solution of 5 ml. of 100% hydrazine-hydrate. The temperature of the mixture rises to 40° C. and the yellow potassium salt of the formula:

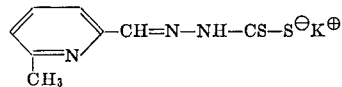

thereby crystallizes out. After suction-filtration and washing with methanol there are obtained 17 g. of M.P. 233–235° C. (decomposition).

EXAMPLE 12

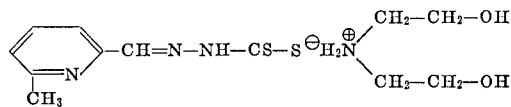

21.1 g. of 5-(6-methyl-pyridyl-2)-4,5-dihydro-1,3,4-thiadiazole-2-thiol are suspended in 250 ml. of alcohol. 10.5 g. of diethanolamine are added followed by heating to boiling. A clear solution is formed from which, upon cooling, the diethanolamine salt separates as an oil. A further 200 ml. of alcohol are added and stirring is continued until the oil is completely crystalline. After suction-filtration nad washing with alcohol, there are obtained 17 g. of yellow crystals. After recrystallization from methanol, the melting point is 123–125° C.

The constitution of the products of the present invention were ascertained by elementary analysis as well as by IR- and MPR-spectra.

What is claimed is:

1. A 5-(2-pyridyl)-4,5-dihydro-1,3,4-thiadiazole-2-thiol derivative having the following structure

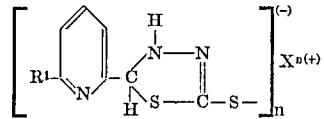

in which $R^1$ is hydrogen or methyl, $X^{n(+)}$ is selected from the group consisting of $Na^+$, $K^+$, $NH_4^+$, $Ca^{++}$, $Mg^{++}$, $HN^+$—$(C_2H_5)_3$, $H_3N^+$—$CH_2CH_2$—$OH$, $$H_2N^+\text{—}(CH_2CH_2\text{—}OH)_2$$

or $HN^+$—$(CH_2CH_2$—$OH)_3$ and $n$ is 1 or 2.

2. The compound of claim 1 which is 5-(pyridyl-2)-4,5-dihydro-1,3,4-thiadiazole-2-thiol-sodium-salt.

3. The compound of claim 1 which is 5-(pyridyl-2)-4,5-dihydro-1,3,4-thiadiazole-2-thiol-ethanolamine-salt.

4. The compound of claim 1 which is 5-(6-methyl-pyridyl-2)-4,5-dihydro-1,3,4-thiadiazole-2-thiol.

5. The compound of claim 1 which is 5-(6-methyl-pyridyl-2)-4,5-dihydro-1,3,4-thiadiazole-2-thiol-di-ethanolamine-salt.

References Cited

Hemmerich et al.: Chem. Abstracts, Col. 10191–2, vol. 53, 1959.

Chubb et al.: Chem. Abstracts, Col. 12118, vol. 54, 1960.

ALAN L. ROTMAN, Primary Examiner

U.S. Cl. X.R.

260—247.1, 293.4; 424—263